March 20, 1956 — W. G. PFANN — 2,739,046
CONTINUOUS PROCESS FOR SEPARATING FUSIBLE MATERIALS
Filed Aug. 6, 1952 — 2 Sheets-Sheet 1

INVENTOR
W. G. PFANN
BY Edwin B. Cave
ATTORNEY

March 20, 1956 W. G. PFANN 2,739,046
CONTINUOUS PROCESS FOR SEPARATING FUSIBLE MATERIALS
Filed Aug. 6, 1952 2 Sheets-Sheet 2

INVENTOR
W. G. PFANN
BY
Edwin B. Cave
ATTORNEY

United States Patent Office

2,739,046
Patented Mar. 20, 1956

2,739,046

CONTINUOUS PROCESS FOR SEPARATING FUSIBLE MATERIALS

William G. Pfann, Basking Ridge, N. J., assignor to Bell Telephone Laboratories, Incorporated, New York, N. Y., a corporation of New York Application August 6, 1952, Serial No. 302,921

5 Claims. (Cl. 23—310)

This invention relates to processes for treating solvent-solute systems for the purpose of producing material having desired concentrations of major and minor ingredients. The processes of this invention utilize variations in solute solubility in adjacent solid and liquid phases in the material being treated. These processes may be applied equally well to systems of metals and their alloys, to salts and salt solutions, both organic and inorganic and to other solute-solvent systems which can be caused to undergo a liquid solid transformation. In one specific embodiment of the invention, semiconductive materials, for example silicon and germanium of such purity as to be useful in the manufacture of semiconductive devices such as rectifiers and transistors, may be produced.

The processes described may be utilized for controlling solute distribution in semiconductive materials so as to produce materials usable in semiconductor amplifiers of the type disclosed in Patents 2,569,347, granted September 25, 1951 to W. Shockley and 2,524,035, granted October 3, 1950 to J. Bardeen and W. H. Brattain. The processes described may be utilized in purifying a major ingredient, in the recovery of a minor ingredient, or in the separation of two or more desired ingredients in any fusible system in which the solute concentrations in different adjoining phases of the material are different. Where the solute concentrations in different adjoining phases of the material undergoing treatment are substantially identical at equilibrium, a form of the process herein described by which the selective solubilities of either the major or the minor ingredient in a third added substance differs between the two phases may be utilized to bring about the desired separation.

In United States patent application Serial No. 256,791, filed November 16, 1951, the use of traveling molten zones for the treatment of fusible materials is described. Certain of the basic principles there set forth together with certain new ones which will be discussed, are utilized in the operation of the processes of this invention.

Whereas the processes of the above-mentioned application are mainly batch processes, that is, in which a given portion of a material is put through a process separate from any other portion, the processes of the present invention are all truly continuous. The principle which enables the processes of this invention to be continuous is that of reflux.

Since an important application of these processes is in the refining and other treatment of semiconductive materials and since the development of this invention is in the main due to research in that field, some of the terminology used and some of the claims will be directed to such materials. Wherever the terminology "impurity" or "significant impurity" is used in the description or claims directed to this invention, it is to be understood that reference is being made to a solute of the system there under consideration. Such impurities may be desired or undesired and further may be present or not before the material undergoes treatment. The terminology "significant impurity" or "significant solute" where used in connection with semiconductors, has reference to solutes which affect the resistivity of the semiconductor under consideration. Solutes which have the effect of adding free electrons to the system and therefore tend to effect N type conductivity are known as donors and those which tend to build up a deficiency of free electrons are known as acceptors. Examples of donors and acceptors for semiconductors of group IV of the periodic table according to the system of Mendelyeev such as, for example, silicon and germanium, are respectively phosphorus, arsenic, antimony and bismuth of group V and boron, aluminum, gallium and indium of group III of the same table. For a comprehensive discussion of the theory of such semiconductive materials see "Electrons and Holes in Semiconductors" by W. Shockley, D. Van Nostrand, 1950. In addition, certain elements other than those in groups III and V are known to be "significant solutes" for germanium and silicon.

In the operation of the basic processes of this invention, effectiveness of separation depends on the dissimilarity of the solubility of one or more minor ingredients in a major ingredient in adjoining liquid and solid phases. The symbol which represents this property of the system being considered is the Greek letter gamma ($\gamma$). For the purposes of this description $\gamma$ will be considered to be a proportionality constant equal to the ratio of the concentration of a minor ingredient in the freezing solid to that of the same minor ingredient in the liquid in contact with said solid and may be determined from the following equation:

$$\gamma = \frac{C}{C_0(1-X)^{\gamma-1}} \qquad (1)$$

where $C_0$ = the mean solute concentration in the starting material;

$X$ = the fraction which has been solidified;

$C$ = the concentration of solute in the refrozen solid at any point at the liquid-solid interface after fraction $X$ has been solidified.

Equation 1 is for use with data obtained from the process known as normal freezing. The derivation of this equation may be found in "Transactions of the American Institute of Mining and Metallurgical Engineers," volume 135, page 85, 1939, by A. Hayes and J. Chipman. In one form of normal freezing process material in a molten state is allowed to freeze unidirectionally from one end to the other, at a rate sufficiently slow to prevent entrapment of liquid in the freezing solid and to permit substantial diffusion of solute in the liquid. The result under most conditions will be a segregation action which will concentrate the solute in one or the other end of the formed body. If the solute lowers the freezing point of the solvent, that is, if $\gamma$ has a value less than 1, then the major portion of the solute will be concentrated in the final portion to freeze. If the solute raises the freezing point, that is, if $\gamma$ has a value greater than 1, the solute will be concentrated near the starting end.

Equation 1 has been theoretically derived and depends for its practical applicability on the design of apparatus usable in carrying out the processes of this invention and on the particular system undergoing treatment. Under certain conditions the equation will be more or less accurate depending upon the degree to which these conditions are approached:

(a) Diffusion in the solid state is negligible;
(b) Diffusion in the liquid state is almost instantaneous;
(c) $\gamma$ is substantially constant (this condition is approximated closely when the material undergoing treatment is a semiconductor such as germanium containing significant impurities and of a purity of the order found in semiconductor devices).

It is to be understood that the obtaining of the above conditions is of importance in theory only and further, that the processes herein to be described will operate although less efficiently where equilibrium is not attained provided that the value of $\gamma$ is not caused to closely approach 1 by, for example, too rapid a rate of crystal growth. However, where these conditions are not closely approached, it may be necessary to run experiments to determine the effective $\gamma$ values to more accurately predict the effectiveness of any given piece of apparatus on which it is desired to process materials in accordance with this invention. For a discussion of the variation in the value $\gamma$ as a function of growth rate, see the article by R. H. McFee in the Journal of Chemical Physics, volume XV, page 856. Although Mr. McFee presents data on a sodium chloride system containing potassium and copper, his method is of general application.

Since it is recognized that a certain amount of diffusion may always be expected in the solid state, and that diffusion in the liquid phase can never be instantaneously complete, it may be noted that the following conditions will have the noted effects on the actual value of $\gamma$.

(a) Any amount of diffusion in the solid state, or any lack of it in the liquid state, causes $\gamma$ to approach 1;

(b) Stirring has the effect of increasing diffusion in the liquid state and, therefore, of causing the actual value of $\gamma$ of the system under consideration to approach its theoretical value;

(c) Formation of dendrites in the freezing substance has the effect of decreasing the diffusion in the liquid state and, therefore, of causing $\gamma$ values of the system under consideration to approach 1. It may, therefore, be noted that increasing the rate of advance of the solid-liquid interface, since it has the effect of causing diffusion in the liquid phase to be more incomplete and further since it may result in the formation of dendrites in the freezing substance, has the effect of causing $\gamma$ values to approach 1. Some factors which affect the actual value of $\gamma$ have been discussed in the aforementioned paper by A. Hayes and J. Chipman;

(d) The higher the temperature gradient between the liquid and the solid, the higher is the effective rate of diffusion in the liquid state. Increasing the temperature gradient, therefore, also has the effect of causing the $\gamma$ value of the system under consideration to approach its theoretical value.

The $\gamma$ value has the following significance in any process utilizing liquid-solid transformation as a means for altering solute distribution in a solute solvent system (all the processes herein to be described are of this class):

(a) The greater is the absolute value of $(1-\gamma)$, the greater is the difference between the mean solute concentration $C_0$ and the concentration of solute in the initial portion to freeze out $(\gamma C_0)$.

(b) Purification or separation for any system will necessarily be more efficient the greater is the differential between the actual $\gamma$ value and 1, regardless of whether the $\gamma$ value is greater than or less than 1.

In its simplest form one of the basic processes of United States application Serial No. 256,791, is the feeding of a charge of solute concentration $C_0$ continuously through a stationary ring heater thereby producing a stationary molten zone which in effect traverses the length of the bar undergoing treatment. In such a process the first concentration to leave the zone in the freezing material will be $\gamma C_0$. As the process continues solute will gradually accumulate in the molten zone for a system in which $\gamma$ is of a value less than 1, and will eventually raise its concentration to $C_0/\gamma$ at which time the concentrations leaving and entering the zone will be equal $(C_0)$ and separation will no longer occur.

The processes of the present invention utilize the principle of reflux, that is, the reverse flow of a fraction of end material through the refining apparatus. By choosing the ratio of forward and reflux flow, it is possible to obtain a situation of dynamic equilibrium in which the concentration of a zone is of any desired value intermediate $C_0$ and $C_0/\gamma$ so that the material freezing out of that zone will be of a determinate concentration less than $C_0$ and so that it will never be necessary to stop the equipment and clean out the zone. The present invention, consequently, is directed to truly continuous processes in the sense that solids are removed from the zones steadily throughout the process so as to result in a steady state in which the zones and the solids emerging from them are of increasing purity stepwise throughout the apparatus and in which the final concentration of the product is constant.

Due to the similarity of the present invention to continuous distillation, terminology from this practice will be used to a considerable degree. The processes of this invention all utilize "reflux," that is, a counter-current or "down-the-column" flow of a portion of the purified product. In the processes herein to be described this reflux flow may take place in the form of liquid or may take the form of a molten zone or zones moving in a reverse direction.

The invention can be better understood by reference to the accompanying drawing in which.

Figure 1A:
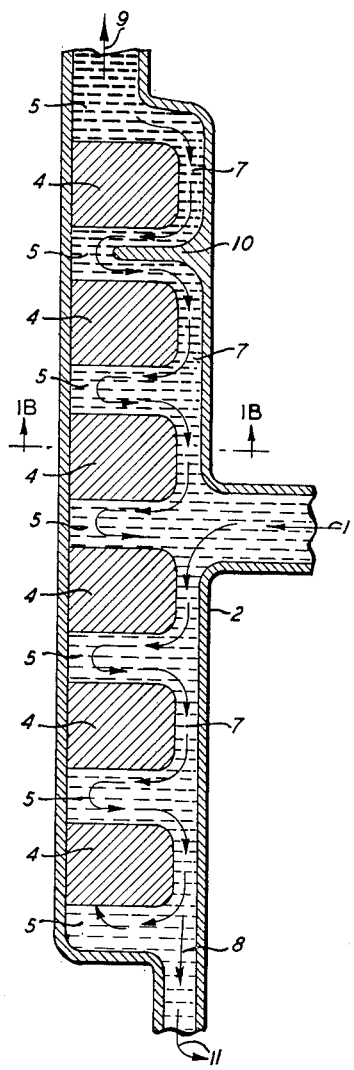
Fig. 1A is a plan view in section of a column utilizing liquid reflux.

Referring again to Figs. 1A and 1B, the apparatus depicted is a liquid reflux continuous zone refiner. Some of the feed which enters column 2 through inlet 1 freezes on moving track 3 to form solid portions 4 and is caused to travel up the column by a mechanical means not shown. As solid portions 4 move up the column they pass through heating means (not shown) corresponding in position with molten regions 5. The hot and cold regions do not move in the sense that there is always solid material at positions 4 and molten material at positions 5. However, material in these positions is always changing since the solid zones are constantly being moved up the column on the moving track 3, the leading edges melting into subsequent zones 5 and the trailing edges being formed by material constantly frozen out of previous zones 5. The material is held on the track by keys 6.

Liquid feed of composition $C_0$ enters at 1, some of it traveling downward in reflux path 7 in which the material is always kept in the molten state by heating means not shown, and some entering molten zone 5 in direct line with inlet 1 and become included in the upward moving solid. At point 8 some of the now impure reflux is discarded, the remainder returning through the refiner upward in the form of solid zones 4. As the pure solid in the uppermost zone 4 melts into the molten zone 5 immediately above it, a fraction of this molten zone (composition $C_p$) is removed as product through outlet 9. The remainder is reflux and travels down path 7.

The reflux mixes with the liquid in each molten zone 5 in succession removing solute from each. Baffles 10, of which one is shown, or other mixing means are helpful in increasing the efficiency of the column. The fraction of molten reflux at point 8 not returned up the column is removed as waste through outlet 11.

The reflux path should be arranged so as to prevent back diffusion of solute up the column. This can be done by making the path long and narrow, by inserting moving plugs in the path, by breaking the path (for example by running it over a ledge as in a waterfall) or by molten zone reflux to be discussed in connection with Figs. 3 and 4. In the treatment of certain systems, it may be helpful to utilize pumps or impellers in the liquid reflux line although the motion of the solid carrier 3 will provide a general circulation in the indicated directions.

Figure 1B:
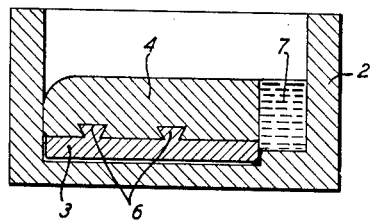
Fig. 1B is an end sectional view of the apparatus of Fig. 1A.

Fig. 1B is an end view of a cross-section at a solid area showing the track. The track may be made in sections similar to the caterpillar belts commonly used in continuous processes.

Figure 2:
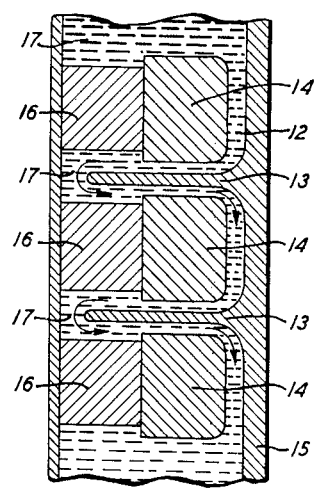
Fig. 2 is a plan view in section of a piece of apparatus similar to that of Fig. 1A and also utilizing liquid reflux but in which the reflux path has been narrowed and lengthened.

The process of Fig. 2 operates on a principle identical to that of Figs. 1A and 1B. In the broken portion of apparatus shown, reflux path 12 has been lengthened by inserting baffles 13 and obstacles 14 all constructed of the same heat-resistant material as the wall 15 of the apparatus. Solid zones 16 and molten zones 17 remaining in fixed positions as in Fig. 1A are created by appropriate placement of heating means not shown. The material may be caused to move up the column by a caterpillar track similar to that shown in Fig. 1B.

Figure 3:
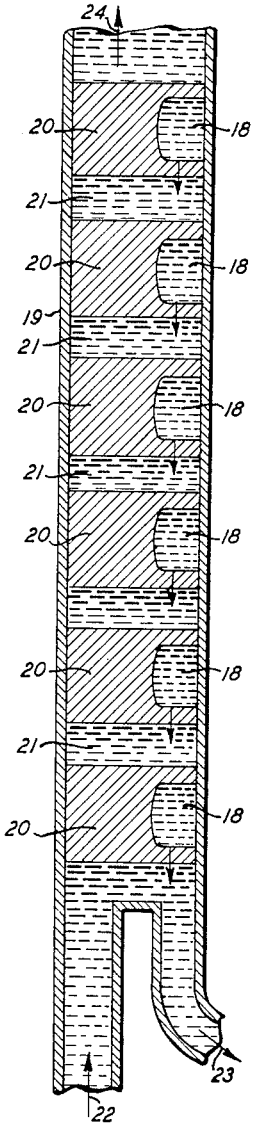
Fig. 3 is a plan view in section of a column in which reflux is being carried out by means of molten zones moving down the column.

Fig. 3 is illustrative of a method of reflux in which solute is prevented from traveling up the column toward the purer regions by causing this reflux to take place by means of molten zone or zones 18 traveling down the column 19, and passing through successive solid regions 20. These reflux zones carry solute and mix in succession with the molten zones 21 of the column. In Fig. 3 reflux zones 18 are smaller in length than the distance between stationary molten zones 21 so as to prevent reflux material from traveling up the column. Increasing the width of molten zones 18 increases the reflux ratio. As molten regions 18 travel down the column they become richer in solute. Feed enters through duct 22 and for systems having a γ of less than 1 and where it is sought to purify the major ingredient, waste withdrawal is through orifice 23 and product withdrawal through outlet 24. It is advantageous to make path 22 long and narrow so as to minimize contamination of entering material by molten zones 18.

Figure 4:
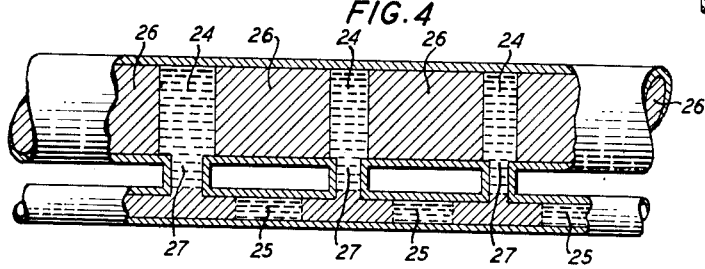
Fig. 4 is a plan view in section of an alternative apparatus utilizing molten zone reflux.

Fig. 4 is a schematic cross-sectional view of an alternative method for carrying out the process of Fig. 3, that is continuous zone melting with reflux taking place in the form of molten zones traveling in an opposite direction. In Fig. 4 fixed heating means, not shown, are placed so as to correspond with molten zones 24 while downward moving heating means, also not shown, produce reflux molten zones 25 traveling down the column. Material is moved, for example, by means of moving tracks, as shown in Fig. 1B, in a direction from left to right in the upper part of the equipment so that it is successively solid in zones 26 and molten in zones 24. The right-hand edges of solid zones 26 represent the melting portions and the left-hand edges of the same solid zones represent the freezing portions. Reflux takes place by means of a free interchange of molten material between molten zones 24 and 25 whenever zones 25 correspond with throated portions 27. The reflux zones are at all times kept shorter than the distance between throats 27 so that there is no opportunity for the reflux material to travel "up the column."

Figure 5:
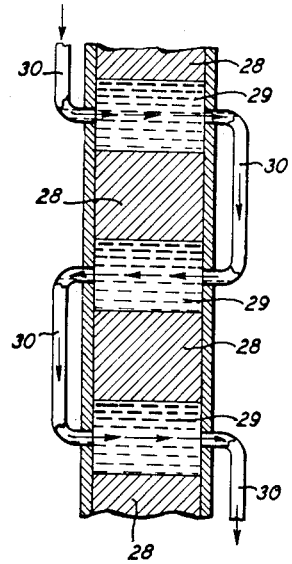
Fig. 5 is a plan view in section of a column utilizing liquid reflux but in which a method for increasing the length of the path of reflux alternative to that of Fig. 2 has been used.

Fig. 5 is a schematic cross-section of a variation of the process as carried out in the apparatus of Fig. 1A and illustrates a method alternative to that carried out in the apparatus of Fig. 2 whereby the reflux paths have been lengthened so as to increase the difficulty of back diffusion. The arrangement of reflux paths, further, has the salutary effect of increasing the effectiveness of mixing in the molten zones. Solid material 28 is caused to move in an upward direction through stationary heaters, not shown, thereby producing molten zones 29. Reflux is produced by sending a molten fraction of the top product down through reflux tubes 30 so that the reflux path is through a given tube 30, a molten zone 29 and thence through the next reflux tube 30 in a downward direction.

Figure 6:
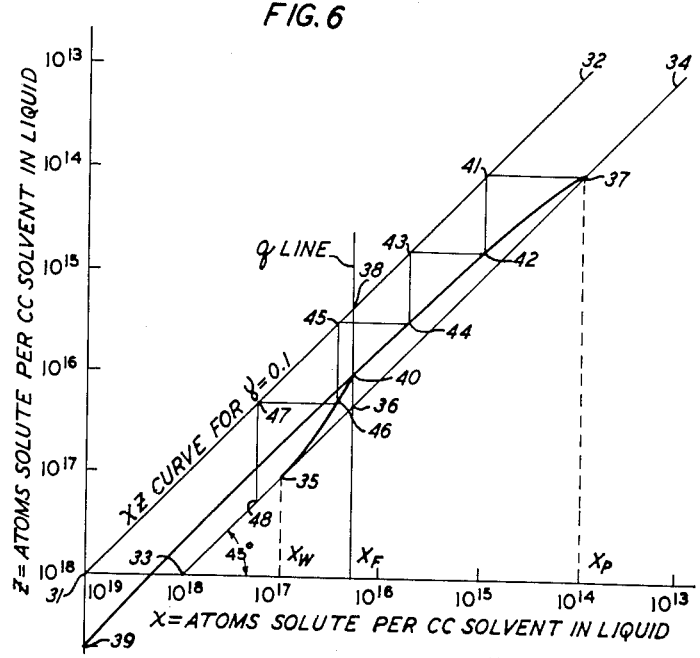
Fig. 6 is a plot to be used in designing apparatus on which the processes of this invention may be carried out.

Fig. 6 will be referred to in connection with a discussion of the theory of continuous zone refining with reflux which follows:

The calculation of the number of plates (fixed molten zones) flows and compositions of feed, waste and product and reflux ratios can be made in a manner similar to that used for making analogous calculations for continuous distillation columns which use the liquid-vapor transformation. A description of these calculations is given in "Elements of Chemical Engineering," by Badger and McCabe, McGraw-Hill, second edition, 1936. The terminology used therein will be used in part below.

The relation of the theory of the zone processes to the McCabe-Thiele method of calculation in the above reference will be made clearer by the following analogy: In a distillation column vapor rises thereby becoming richer in the more volatile component A. Liquid reflux flows downward, this flow originating as a portion of the condensed vapor which emerges from the top of the column. Feed containing A and B in liquid or vapor form enters at the feed plate. Waste richer in less volatile component B leaves at the bottom. The plates above the feed plate constitute the rectification section and those below it the stripping section.

In the continuous crystallization refiner, solid moves up the refiner becoming purer in solute A (for a system in which γ of the solute in the solvent is of a value less than 1). Feed in liquid or solid form enters at or about a given molten zone constituting the feed plate. As in distillation, rectification occurs above the feed plate and stripping below it.

If the $xy$ curve of the system is known, a graphical stepping procedure known as the McCabe-Thiele method permits calculations for the distillation column to be made (see page 346 "Elements of Chemical Engineering," supra).

Fig. 6 is illustrative of a graphic method analogous to the McCabe-Thiele method by means of which apparatus for carrying out the processes of this invention may be designed. By the proper use of a plot similar to that of Fig. 6 and of the method to be described, unknowns in the operating processes may be calculated. For example, where the compositions of end products desired and the quantity of material to be treated are known, it is possible to determine a combination of number of molten regions (or furnaces), reflux ratio, condition of feed, and location of feed to produce the desired results. Conversely, where the equipment on which purification is to take place is already in existence so that the number of furnaces is a known quantity, the method to be described may be used for determining the proper reflux ratio and the point at which the feed should be introduced, which combination will be most satisfactory for producing the desired concentrations of end products. The calculation may also be utilized for locating the feed and for determining an optimum reflux ratio for obtaining either a minimum amount of solute in one end product or a maximum amount of solute in the other end product on a given piece of equipment. Variations in the calculation by which other unknowns may be determined will become apparent either by reference to Badger and McCabe or as the needs of the art develop.

Referring now to Fig. 6, illustrative of the calculations which may be made on such a plot of $z$ atoms of solute per cubic centimeter of solvent in the solid versus $x$ atoms of solute per cubic centimeter of solvent in the liquid, consider the following problem:

A column refining process utilizing liquid reflux such, for example, as the process of Fig. 1A which has a feed composition $x_F$ of known molal heat content, one end product of composition $x_P$ (concentration of A in the liquid product withdrawn from the top of the refiner), and an end product $x_W$ withdrawn from the other end of the refiner (concentration of A in the liquid product withdrawn from the bottom of the refiner and richer in solute A in the system in which the $\gamma$ value is less than 1) operates with a reflux ratio of R mols per mol of product. The two unknowns to be determined by this graphical calculation are the number of molten regions (analogous to theoretical plates in the McCabe-Thiele calculation) necessary to produce end products of composition $x_P$ and $x_W$ and the optimum point for introduction of the feed. In carrying out the method of Fig. 6 one proceeds as follows:

(1) The equilibrium curve 31—32 and the $x=z$ diagonal 33—34 are plotted conventionally. Note that the $xz$ curve in the system here under consideration, that is, for a $\gamma$ of 0.1 appears as a straight line parallel to the $x=z$ line on log-log coordinates indicating that the value of $\gamma$ is constant over the range of composition shown.

(2) The $x=x_W$, $x=x_F$ and $x=x_P$ lines are all projected until their respective intersections 35, 36, 37 with the $x=z$ diagonal.

(3) $q$-line 36—38 is calculated from the molal heat content of the feed and is plotted by passing a line through point 36 and having a slope which may be determined by methods analogous to those described on pages 350–351 of Badger and McCabe. For the purposes of this calculation the following guides for determination of the slope of the $q$-line are set forth: When the feed which is introduced is liquid at its freezing point so that no thermal disturbance results within the liquid stream of the apparatus, the $q$-line appears as the vertical projection 36—38 of Fig. 6. When feed is introduced as a solid at its melting point, the slope of the $q$-line is 0 and will be represented on the plate as a horizontal line passing through point 36. If the feed is mixed solid and liquid in equilibrium the slope of the $q$-line will be upward and to the left. If the thermal condition of the feed is such that the heat content is higher than that of the liquid at its freezing point, the slope of the $q$-line will be upward and to the right, and if the thermal condition of the feed is such that the heat content is less than that of the solid at its melting point, the slope of the $q$-line will be downward and to the left.

(4) The intercept $$\frac{x_P}{R+1}$$

is calculated and plotted on the $z$ axis as point 39. Operating curve 37—39, which would appear as a straight line on rectangular coordinates, is then drawn. This establishes point 40 on the $q$-line.

(5) Point 40 is connected with point 35 to give operating curve 35—40 which latter would also appear as a straight line on rectangular coordinates.

(6) Starting at point 37, a series of rectangular steps 37, 41, 42, 43, 44, 45 are drawn between equilibrium curve 31—32 and operating line 37—40 corresponding with the rectification section of the process. The steps are continued until point 40 is passed, this occurring at intersection 43. The vertical line 45—46 is then dropped to operating line 35—40, and this second operating line, corresponding with the stripping section of the process, is utilized until the last vertical line coincides with point 35 or a lesser value. In the calculation shown on Fig. 6, step 46, 47, 48 corresponds to the last molten region in the stripping section of the refiner.

The total number of steps is the total number of molten regions in the refiner and the step straddling the $q$-line is the molten region into which the feed should be introduced. Consequently, in the illustrative example on Fig. 6 there will be four molten regions and the feed will be introduced into the second from the bottom.

In using the McCabe-Thiele method for calculations in connection with the continuous crystallization column processes of this invention, the following three changes have been made. For convenience and illustrative purposes, the system chosen is that of germanium containing as an impurity a substance such as arsenic which lowers the melting point of the germanium and, therefore, a system in which the $\gamma$ value of the solute in the solvent is of a value less than 1.

(a) For the impurities of interest in germanium, that is the significant impurities, for example, arsenic, antimony, gallium, indium, aluminum, etc. the ratio of the solute concentrations in solid and liquid phases in equilibrium is approximately constant over a wide range of small concentrations. For solidification rates of the order of 0.001 inch per second (which rate is within the range used in the recrystallization of germanium) approximate values of $\gamma$ are 0.1 for arsenic, gallium and aluminum, 0.01 for antimony and 0.001 for indium. Consequently, the curve corresponding to the $xy$ curve of the McCabe-Thiele plot for germanium containing such a solute is a straight line. This line appears on Fig. 7 as $xz$.

(b) The concentrations of interest in germanium, which is to be used as a semiconductive material, may be conveniently expressed in terms of atoms of impurity per cubic centimeter of germanium. This impurity concentration in semiconductive materials such as germanium is of vital importance in that it effects electrical conductivity and further in that the higher is the concentration the lower are the lifetimes of injected carriers. It is also recognized that impurities other than the significant impurities of groups III and V, for example nickel, copper and gold, may be expected to lower the lifetimes. In the impurity range here under consideration, the electrical conductivity is directly proportional to the concentration of the significant impurity. Hence $x$ will represent atoms per cubic centimeter of solute in the liquid and $z$ will represent concentration of solute in the solid at the interface at equilibrium also expressed in units of atoms per cubic centimeter.

(c) Since ranges of several decades of concentration are of interest, it is convenient to plot the $xz$ curve in the McCabe-Thiele plot on log-log coordinates. A range of concentration of interest for many applications of semiconductors is from about $10^{12}$ to about $10^{18}$ atoms of significant impurity per cubic centimeter of semiconductor. As shown in Fig. 7, for a $\gamma$ of 0.1 the $xz$ curve is a straight line parallel to the $x=z$ or 45-degree line. The operating lines, which are straight lines on the usual arithmetic plots, appear as curves on the log-log plot of Fig. 7 and are readily determined from the equations in the above-cited reference.

In the refining of germanium, it is desired to reduce conductivity produced by significant impurities to a value approaching that corresponding to intrinsic conductivity. At 25° C. the value at which impurity conductivity equals intrinsic conductivity occurs at $3 \times 10^{13}$ atoms per cubic centimeter. Germanium available in normally pure form from commercial sources may have conductivity producing impurity concentrations of the order of $2 \times 10^{15}$ or $2 \times 10^{16}$ atoms per cubic centimeter. Scrap germanium which is to be purified by zone refining may have even higher concentrations of conductivity producing impurities. As a reference point $3 \times 10^{13}$ atoms per cubic centimeter in germanium corresponds to about $7 \times 10^{-8}$ atomic per cent of impurity in germanium. This is an extremely small concentration.

In the calculation of Fig. 6 a product concentration $x_D$ of about $1 \times 10^{14}$ atoms per cubic centimeter, a feed concentration $x_F$ of about $2 \times 10^{16}$ atoms per cubic centimeter and a waste concentration $x_W$ of about $1 \times 10^{17}$ atoms per cubic centimeter, are assumed. A reflux ratio R equal to 1 is assumed where:

$$R = \frac{L}{D} \quad (2)$$

and where

L = flow of reflux down the refiner;
D = flow of product out of the top of the refiner.

At a vertical $q$-line (corresponding to the introduction of liquid feed at the temperature of the liquid in the appropriate molten zone or "feed plate"), it is found that a total of four theoretical plates (molten zones) are needed, three in the rectification section and one in the stripping section. The flows F of feed, W of waste, and P of product in relative units are 10, 2 and 8, respectively.

By a calculation method analogous to those described in the section "Distillation" of the above-mentioned reference, the standard distillation characteristics such as plate efficiency and optimum reflux, may be calculated.

The calculation discussed above in connection with Fig. 6 is applicable only to processes of this invention utilizing liquid reflux. The following discussion is relevant to processes of this invention utilizing molten zone reflux for example on the apparatus depicted in Fig. 3.

Considering such a process, let the reflux ratio R be defined as $$\frac{L}{P}$$

where $L$ = effective downward volume flow rate of liquid, and $P$ = upward volume flow rate of solid. When a reflux zone moves downward, solute travels with it although there is no flow of solvent. The net effect is substantially as if a volume of liquid equal to that of the zone does travel downward. P is simply the total upward flow rate of solid, that is, the linear rate times the effective cross-sectional area of the column. Although on superficial examination this would appear to leave no cross-sectional area for the molten zone reflux, it will be seen that the reflux zone travels through the ascending solid. L is the downward volume flow rate of liquid which, since it is intermittent, must be taken on a time average basis. Thus, L will depend on the length of the reflux zone, on the area of the reflux zone (it may occupy as much as the entire cross-sectional area of the column), on the distance between reflux zones and on the linear velocity of the reflux zones.

When these considerations have been taken into account a calculation similar to that discussed in connection with Fig. 6 may be carried out for processes of this invention utilizing molten zone reflux. It should be noted, however, that the basic design of apparatus on which such a process may be carried out prohibits the introduction of feed at any position other than the bottom of the column. Therefore, such a calculation would have only one operating line corresponding with the rectification section line 37—40 of Fig. 6.

The capacity of any apparatus on which the processes of this invention are run is limited solely by practical matters such as column dimensions, effectiveness of heat transfer and effectiveness of mixing in the molten zones. It is evident that the processes described can be equally well used for a product yield of the order of either grams per hour or tons per hour so that the processes may be used for commercial refining of metals such as lead, zinc, tin, copper, silver, gold, iron and many others. A complete listing of all the materials which can be treated by these processes would include all materials capable of being caused to undergo phase changes by thermal means without deleterious chemical or other change occurring, and further, in which the solubility of a minor ingredient differs in the two phases coexisting at equilibrium.

Depending on the nature of the materials undergoing treatment, possible necessary modifications suggest themselves. For example, it may be that the system under consideration is liquid at room temperature so that the problem would be one of refrigerating rather than heating and so that fixed refrigerating means would be substituted for the fixed heating means here above referred to. Similarly, the application of the processes described may be found to be economically feasible even where the materials under treatment are gaseous at room temperature.

It is feasible to purify crystals of a substance such as table salt by the processes of this invention. In such a process moving sieves are substituted for the moving caterpillar tracks described in connection with Fig. 1B. Where this change is made, the McCabe-Thiele plot is no more than an approximation, although a very accurate one, since the concentrations dealt with represent averages and since the concentrations in the molten zones vary depending upon whether a sieve is just entering or just leaving a given molten zone.

For the purification of semiconductive materials such as germanium and silicon and other elements of the fourth group of the table according to Mendelyeev and containing an impurity which raises its melting point (that is, a solute-solvent system having a $\gamma$ value greater than 1, such for example, as boron or silicon in germanium), the refiner may be operated as described except that the purer germanium will emerge at the bottom of the column and the less pure at the top. Where two or more impurities are present, some of which lower and some of which raise the melting point, it may be necessary to rerun the exit materials separately by, for example, one of the column processes herein described.

Where it is found that the systems under consideration do not permit of an efficient separation due to a $\gamma$ value which closely approaches 1, so that solute concentrations in adjoining solid and molten phases at equilibrium are substantially identical, it may be found helpful to introduce a third component such as a solvent in which one or the other of the original components is more soluble in adjoining phases. When this is done one of the fractions will be rich in one of the original components together with the third component. These two components will then be separated by any of the column processes of this invention. This is analogous to the process known to those skilled in the crystallization art as "salting out." The nature of the third component will, of course, be determined by the nature of those components already present in the material undergoing treatment. In metal systems, it is apt to be a third metal, whereas, in other systems it may be any substance which will act as a solvent for either of the components present in the material undergoing treatment.

The heating or cooling means used in any of the processes herein described, will be determined by the systems undergoing treatment and further the rapidity with which it is desired to treat the substance. Heating may be by means of furnaces or gas flames or may be brought about electrically either directly by passing current through turns of high resistance wire such as, for example, Nichrome, or indirectly by the passage of radio or other high frequency currents through turns of wire surrounding that portion of the column within which it is desired to maintain molten zones.

What is claimed is:

1. The process of redistributing the ingredients of a fusible material containing at least two ingredients within a column comprising maintaining relatively hot and cold regions alternately spaced along the length of said column such that the fusible material is molten within the hot regions and solid within the cold regions, continuously moving a conveyor in one direction within the column which conveyor is so designed that the solid material within the column is at all times moving with the conveyor, maintaining a flow of molten material in a direction opposite to the motion of the said conveyor, allowing the oppositely flowing molten material to freely mix with the molten material within the hot regions, withdrawing material from either end of the column and continuously adding as feed fusible material undergoing treatment the said two ingredients being such that the relative concentrations in adjoining solid and molten regions at equilibrium are dissimilar.

2. The process of claim 1 in which the feed is added at a position intermediate the two ends of the column.

3. The method of claim 2 in which one of the two ingredients of the fusible material undergoing treatment consists of an element selected from the group consisting of germanium and silicon.

4. The process of redistributing the ingredients of a fusible material containing at least two ingredients within a common receptacle comprising maintaining relatively hot and cold regions alternately spaced along the length of said common receptacle such that the fusible material is molten within the hot regions and solid within the cold regions and, further, in which said hot and cold regions extend across the entire cross-section of said receptacle, continuously moving a conveyor in one direction within the receptacle so designed that the solid material within the column is at all times moving with the conveyor, causing molten regions to travel in a direction opposite to the motion of said conveyor which regions are shorter in the direction of travel than is the solid material within the cold regions, allowing the molten material within these moving molten regions to freely mix with the molten material within the hot regions, withdrawing material at either end of the column and continuously adding as feed fusible material from the system undergoing treatment the said two ingredients being such that the relative concentrations in adjoining solid and molten regions at equilibrium are dissimilar.

5. The method of claim 4 in which one of the two ingredients of the fusible material undergoing treatment consists of an element selected from the group consisting of germanium and silicon.

References Cited in the file of this patent

UNITED STATES PATENTS

| | | |
|---|---|---|
| 1,778,018 | Blaylock et al. | Oct. 14, 1930 |
| 1,910,920 | Higgins | May 23, 1933 |
| 1,938,101 | Hall | Dec. 5, 1933 |
| 1,967,053 | Fingland | July 17, 1934 |
| 2,620,263 | Macklin | Dec. 2, 1952 |
| 2,679,539 | McKay | May 25, 1954 |

OTHER REFERENCES

Trans. Amer. Electro. Chem. Soc., vol. 89 (1946), page 280 Jaffee, McMullen, Gonser.